US011233443B2

(12) United States Patent
Mizushima et al.

(10) Patent No.: US 11,233,443 B2
(45) Date of Patent: Jan. 25, 2022

(54) COIL BENDING MACHINE

(71) Applicants: TOYOTA JIDOSHA KABUSHIKI KAISHA, Toyota (JP); DENSO CORPORATION, Kariya (JP)

(72) Inventors: Daisuke Mizushima, Toyota (JP); Yasuyuki Hirao, Okazaki (JP); Hiroaki Takeda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 387 days.

(21) Appl. No.: 16/226,968

(22) Filed: Dec. 20, 2018

(65) Prior Publication Data
US 2019/0199183 A1   Jun. 27, 2019

(30) Foreign Application Priority Data

Dec. 22, 2017 (JP) .............................. JP2017-246015

(51) Int. Cl.
| H02K 15/04 | (2006.01) |
| H02K 15/10 | (2006.01) |
| H02K 15/02 | (2006.01) |
| H02K 15/06 | (2006.01) |
| H02K 15/00 | (2006.01) |
| H02K 3/34 | (2006.01) |

(52) U.S. Cl.
CPC ......... *H02K 15/0428* (2013.01); *H02K 3/345* (2013.01); *H02K 15/00* (2013.01); *H02K 15/0031* (2013.01); *H02K 15/0087* (2013.01); *H02K 15/02* (2013.01); *H02K 15/024* (2013.01); *H02K 15/064* (2013.01); *H02K 15/10* (2013.01)

(58) Field of Classification Search
CPC .... H02K 15/0428; H02K 15/00; H02K 15/02; H02K 15/064; H02K 3/345; H02K 15/0031; H02K 15/0087; H02K 15/10; H02K 15/024; H02K 15/085
See application file for complete search history.

(56) References Cited

U.S. PATENT DOCUMENTS 5,491,886 A      2/1996  Keiffer et al.
2017/0373570 A1* 12/2017 Muto ................. H02K 15/0031

FOREIGN PATENT DOCUMENTS

| JP | 60-62853 A | 4/1985 |
| JP | 2008-79443 A | 4/2008 |

(Continued)

*Primary Examiner* — Peter Dungba Vo
*Assistant Examiner* — Jose K Abraham
(74) *Attorney, Agent, or Firm* — Sughrue Mion, PLLC

(57) ABSTRACT

A coil bending machine is a machine that, in a stator core including a yoke and multiple teeth and having a slot formed between circumferentially adjacent teeth, while lead portions of a segment coil which is a U-shaped lead wire including a bent portion K and two lead portions R extending from the bent portion are inserted into two slots, push-bends end portions of the lead portions protruding from an axial end face of the stator core toward the stator core. The coil bending machine includes a coil bending member that push-bends the end portions of the lead portions protruding from the axial end face of the stator core toward the stator core, and a coil pressing mechanism that press-fixes a segment coil inside the slot toward the yoke, from the radially inner side of the stator core.

4 Claims, 9 Drawing Sheets

(56) References Cited

FOREIGN PATENT DOCUMENTS

| | | | | |
|---|---|---|---|---|
| JP | 2008-148521 A | | 6/2008 | |
| JP | 2013-172575 A | | 9/2013 | |
| JP | 2015-104249 A | | 6/2015 | |
| JP | 2016-127692 A | | 7/2016 | |
| KR | 20140095667 A | * | 8/2014 | |
| WO | WO-2016140194 A1 | * | 9/2016 | ............... H02K 3/04 |

* cited by examiner

COIL BENDING MACHINE

CROSS REFERENCE TO RELATED APPLICATION

The disclosure of Japanese Patent Application No. 2017-246015 filed on Dec. 22, 2017 including the specification, claims, drawings, and abstract is incorporated herein by reference in its entirety.

TECHNICAL FIELD

The present disclosure generally relates to a coil bending machine, and more particularly to a coil bending machine that push-bends the lead portions of multiple U-shaped segment coils inserted into slots of a stator core.

BACKGROUND

JP 2008-79443 A describes a conventional coil twisting machine. The coil twisting machine is configured to, while two lead portions of a segment coil which is a U-shaped lead wire are inserted into slots of a stator core, bend the end portions of the lead portions protruding from an end face of the stator core in a twisting manner. In doing so, a coil presser member is brought into contact with a bent portion of the U-shaped segment coil to restrict axial movement of the segment coil relative to the stator core.

SUMMARY

Technical Problem

In the above coil twisting machine, the coil presser member is brought into contact with the bent portion of the U-shaped segment coil to restrict axial movement of the segment coil. However, when the pressing force for push-bending the end portion of the lead portion toward the stator core increases, the bent portion of the segment coil may deform under the axial pressing load applied on the lead portion. As a result, when the stator core is taken out of the coil twisting machine after bending, springing back of the bent portion of the segment coil may cause fluctuation in the amounts of protrusion of the bent portions from the end face of the stator core.

It is an advantage of the present disclosure to provide a coil bending machine capable of suppressing deformation of a bent portion of a segment coil, thereby equalizing the amounts of protrusion of the bent portions from an end face of a stator core.

Solution to Problem

A coil bending machine according to the present disclosure is configured to, in a stator core including a cylindrical yoke and multiple teeth that protrude radially inward from the yoke and that are spaced uniformly in a circumferential direction, and having a slot formed between circumferentially adjacent teeth, while lead portions of a segment coil which is a U-shaped lead wire including a bent portion and two of the lead portions extending from the bent portion are inserted into two slots, push-bend end portions of the lead portions protruding from an axial end face of the stator core toward the stator core.

The coil bending machine includes: a coil bending member that push-bends the end portions of the lead portions protruding from the axial end face of the stator core toward the stator core; and a coil pressing mechanism that press-fixes the segment coils inside the slot toward the yoke in the slot, from a radially inner side of the stator core.

According to this configuration, the coil pressing mechanism press-fixes the segment coils inside the slot toward the yoke in the slot, from the radially inner side of the stator core. Hence, it is possible to prevent transmission of axial load applied to bend the lead portion of the segment coil to the bent portion of the segment coil, so that deformation of the bent portion of the segment coil can be suppressed. As a result, the amounts of protrusion of the bent portions of the segment coils from the end face of the stator core can be equalized after bending of the coils.

In the coil bending machine of the present disclosure, the coil pressing mechanism preferably includes: a coil presser member that press-fixes the segment coils inside the slot toward the radially outer side; a cylindrical holding member that holds the coil presser member in a radially movable manner; an axially moving member that is provided on an inner side of the holding member in an axially movable manner, and has a tapered outer circumferential face in contact with an inner circumferential tilted face of the holding member; and driving means that moves the axially moving member in the axial direction.

According to this configuration, the driving means moves the axially moving member, and the tapered outer circumferential face of the axially moving member pushes the inner circumferential tilted face to move the coil presser member to the radially outer side, so that the segment coils in the slot may be press-fixed to the radially outer side. As a result, it is possible to prevent transmission of axial load applied to bend the lead portion of the segment coil to the bent portion of the segment coil, so that deformation of the bent portion of the segment coil may be suppressed. Hence, the amounts of protrusion of the bent portions of the segment coils from the end face of the stator core may be equalized after bending of the coils.

In this case, an axially extending slit preferably penetrates the coil presser member in the circumferential direction. According to this configuration, the slit allows the coil presser member to elastically deform more easily in the radial direction. Hence, even when there is fluctuation in the product shape of the segment coils, the segment coils in the slot may be press-fixed with a more stable pressing force than when the coil presser member is formed of a stiff body.

In the coil bending machine of the present disclosure, an insulating sheet may be provided along a slot inner wall face inside the slot, both ends of the insulating sheet on the radially inner side may be arranged to open toward a radial opening of the slot, and a guide protrusion to be inserted between the both ends of the insulating sheet may be formed on an axial end face of a radially outer end portion of the coil presser member.

According to this configuration, by moving the coil presser member in the axial direction so as to insert the guide protrusion between both ends of the insulating sheet, it is possible to prevent sandwiching of the insulating sheet between the coil presser member and the segment coil inside the slot. As a result, the segment coil in the slot may be press-fixed with a stable pressing force.

Advantageous Effects of Invention

According to the coil bending machine of the present disclosure, deformation of a bent portion of a segment coil may be suppressed to equalize the amounts of protrusion of the bent portions from an end face of a stator core.

BRIEF DESCRIPTION OF DRAWINGS

Embodiments of the present disclosure will be described by reference to the following figures, wherein.

DESCRIPTION OF EMBODIMENTS

Hereinafter, embodiments according to the present disclosure will be described in detail with reference to the accompanying drawings. In the description, specific shapes, materials, numeric values, directions, and the like are examples for facilitating understanding of the present disclosure, and may be appropriately changed according to the usage, purpose, specification, or the like. Also, when multiple embodiments, modifications, or the like are included in the following, use of an appropriate combination of characteristic portions thereof has originally been assumed.

Figure 1:
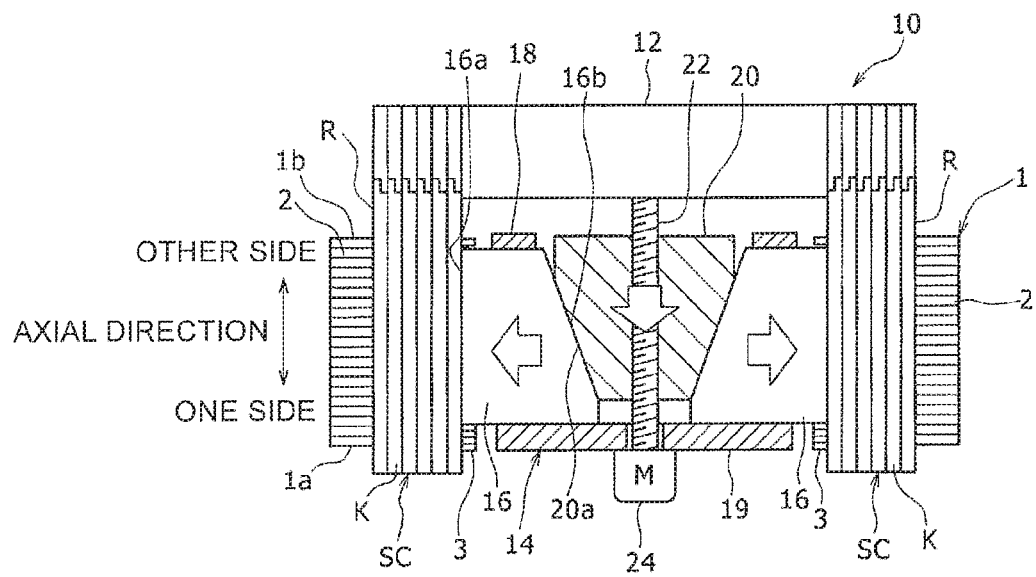
FIG. 1 is a sectional view taken along the axial direction of a coil bending machine of an embodiment.
Figure 2:
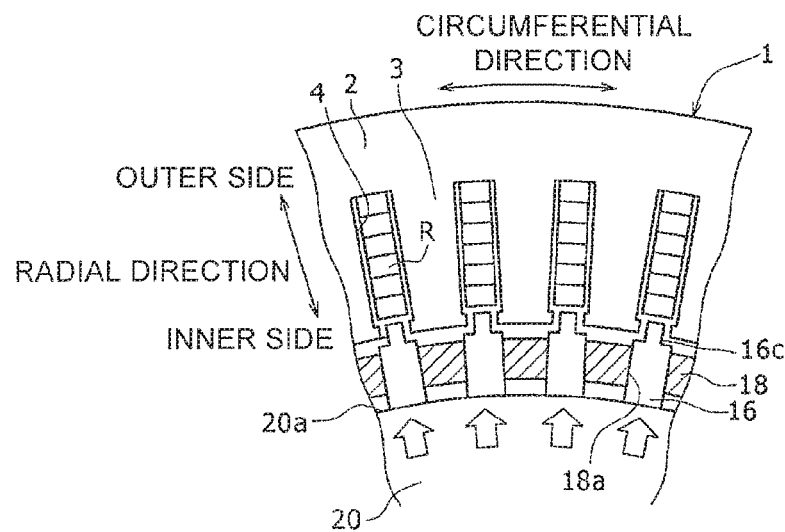
FIG. 2 is a fragmentary sectional view taken along the radial direction of the coil bending machine of the embodiment.

FIG. 1 is a sectional view taken along the axial direction of a coil bending machine 10 of an embodiment, and FIG. 2 is a fragmentary sectional view taken along the radial direction of the coil bending machine 10 of the embodiment. In FIG. 1, the axial direction (or lamination thickness direction) of a stator core 1 is indicated by an arrow, and in FIG. 2, the radial direction and circumferential direction of the stator core 1 are indicated by arrows.

The coil bending machine 10 is a machine for push-bending a lead portion R of a segment coil SC assembled onto the stator core 1. Hereinbelow, the stator core 1 and the segment coil SC will first be described, and then the coil bending machine 10 will be described.

The stator core 1 is composed of a cylindrical magnetic member. The stator core 1 is formed by axially laminating and integrally connecting flat rolled magnetic steel sheets punched into annular shapes, for example.

As shown in FIGS. 1 and 2, the stator core 1 has a circumferentially extending yoke 2, and multiple teeth 3 protruding radially inward from the yoke 2. The teeth 3 are spaced uniformly in the circumferential direction in the yoke 2. Additionally, the teeth 3 extend over the entire axial length of the stator core 1.

A slot 4 is formed between circumferentially adjacent teeth 3. The slot 4 is an axially extending groove that opens on an axial end face of the stator core 1, and also opens toward the radially inner side of the stator core 1. A radially outer bottom portion of the slot 4 is formed by the yoke 2, and is also referred to as a back yoke.

As shown in FIG. 2, a projecting portion projecting to both circumferential sides is formed on a radially inner end of each of the teeth 3. Accordingly, the circumferential width of a radially inner opening portion of the slot 4 is narrower than the circumferential width of other parts of the slot 4. This keeps the lead portion R of the segment coil SC placed inside the slot 4 from coming off to the radially inner side. Note that the circumferential width of the slot 4 is formed as a constant circumferential width except for the radially inner opening portion.

Multiple lead portions R of the segment coil SC are placed inside the slot 4. FIG. 2 shows an example in which six lead portions R are arranged in the radial direction. Note, however, that the number of segment coils SC placed inside the slot 4 is not limited to six, and other number of segment coils SC (such as eight) may be provided.

Figure 3A:
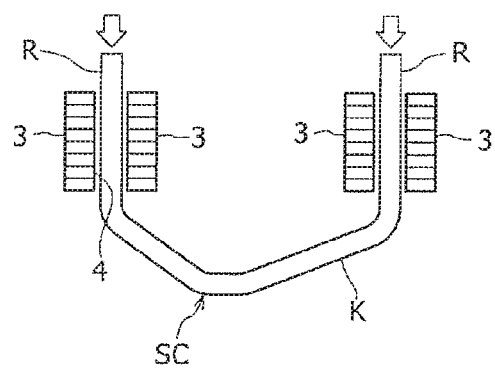
FIG. 3A is a radial view of how lead portions of a segment coil are press-fixed inside slots.
Figure 3B:
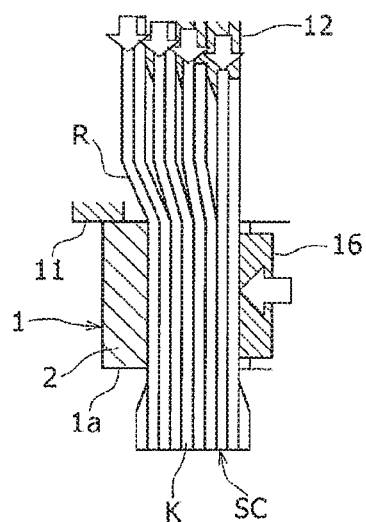
FIG. 3B is a circumferential view of how the lead portions of the segment coil are press-fixed inside the slot.

FIGS. 3A and 3B are views showing how the lead portion of the segment coil is press-fixed inside the slot. As shown in FIG. 3A, the segment coil SC is a U-shaped lead wire that includes, as one body, a bent portion K bent into a substantial V shape, and two lead portions R extending from both ends of the bent portion K. The two lead portions R of the segment coil SC extend in parallel to each other.

As shown in FIG. 2, the segment coil SC is formed of a square lead wire (e.g., flat wire) having a rectangular section, for example. The segment coil SC includes a copper wire as a conductive portion, and an insulating coating that covers the periphery of the copper wire. Note that although not shown, at the tip end of the lead portion R, the insulating coating is removed in advance for welding in a later step so that the copper wire is exposed.

Before the segment coil SC is assembled onto the stator core 1, an insulating sheet (or insulating paper) 5 is placed inside the slot 4 (see FIG. 15). The insulating sheet 5 is made of a sheet material made of insulating resin, for example, and has a function of improving the insulating property between the lead portion R of the segment coil SC inside the slot 4 and the stator core 1.

The insulating sheet 5 is folded in advance to form a substantial U shape in axial view. In this state, the insulating sheet 5 is inserted from the axial direction to be placed inside the slot 4. Accordingly, in the slot 4, the insulating sheet 5 is placed along two inner wall faces facing each other in the circumferential direction, and a radial inner wall face positioned on the radially outer side. Meanwhile, on the radially inner side of the slot 4, two end portions of the insulating sheet 5 are open, and a space between the two end portions faces the radially inner opening portion of the slot 4.

The two lead portions R of the segment coil SC are placed by being inserted into two slots 4 from an end face 1a on one side in the axial direction of the stator core 1. In doing so, the lead portion R is placed on the inner side of the insulating sheet 5 inside the slot 4. In the embodiment, the two lead portions R are inserted not into circumferentially adjacent slots 4, but into two slots 4 spaced apart in the circumferential direction with a predetermined number of slots 4 interposed therebetween. Multiple (e.g., six) segment coils SC are inserted in the same manner, and the lead portions R are arranged in the radial direction in all of the slots 4. As shown in FIG. 1, in each segment coil SC arranged in this manner, an end portion of the lead portion R protrudes from an end face 1b on the other side in the axial direction of the stator core 1.

As shown in FIG. 1, the stator core 1 in which the segment coils SC are arranged in the above-mentioned manner is set in the coil bending machine 10. When being set, the stator core 1 is fixed by a fixing member 11 (see FIG. 3B) or the like.

As shown in FIGS. 1 and 2, the coil bending machine 10 includes a coil bending member 12 and a coil pressing mechanism 14. The coil bending member 12 has a function of bending the end portion of the lead portion R of the segment coil SC protruding from the axial end face of the stator core 1 so as to push it down toward the stator core 1. Specifically, the tip end of each lead portion R engages with an engaging portion formed on a lower face of the coil bending member 12. In this state, the coil bending member 12 rotates in the circumferential direction, while moving toward the stator core 1. This bends and pushes down the end of the lead portion R toward the stator core 1.

The coil pressing mechanism 14 has a function of press-fixing the lead portion R of the segment coil SC inside the slot 4 toward the yoke 2 inside the slot 4, from the radially inner side of the stator core 1. The coil pressing mechanism 14 includes a coil presser member 16, a holding member 18, an axially moving member 20, a threaded shaft 22, and a motor 24. The threaded shaft 22 and the motor 24 form driving means that moves the axially moving member 20 in the axial direction.

The coil presser member 16 is a member that press-fixes the lead portion R of the segment coil SC inside the slot 4 toward the radially outer side. The coil presser members 16 are provided in the same number (e.g., 48) as the slots 4. The coil presser member 16 is made of a metal plate, for example. Additionally, as shown in FIG. 1, the coil presser member 16 is formed into a substantial trapezoid in side view, and has a radially outer side face 16a and a radially inner tilted face (inner circumferential tilted face) 16b. In the coil presser member 16, the side face 16a is formed along the axial direction. The tilted face 16b is tilted with respect to the axial direction, and specifically, is tilted so as to spread radially outward gradually from one side to the other side in the axial direction.

Moreover, as shown in FIG. 2, a radially outer end portion 16c of the coil presser member 16 is formed narrower than other parts thereof. Hence, the end portion 16c of the coil presser member 16 may be inserted into the slot 4 from the radially inner opening portion of the slot 4.

The holding member 18 is a member that holds the coil presser member 16 in a radially movable manner. The holding member 18 is composed of a cylindrical metal member, for example. The holding member 18 is fixed by being screwed, for example, to a disc-shaped base plate 19. An axially long and narrow guide groove 18a is formed in the holding member 18 in a position facing each slot 4. The coil presser member 16 is radially slidably placed in the guide groove 18a.

The axially moving member 20 is provided on the inner side of the holding member 18 in an axially movable manner. As shown in FIG. 1, the axially moving member 20 has a substantially truncated cone-shaped section, and has a tapered outer circumferential face 20a tilted with respect to the axial direction. The tilt angle of the outer circumferential face 20a is set to the same tilt angle as the tilted face 16b of the coil presser member 16. Accordingly, the entire outer circumferential face 20a of the axially moving member 20 is brought into contact with the tilted face 16b of the coil presser member 16.

In addition, a tapped hole axially penetrates the center of the axially moving member 20, and the threaded shaft 22 is screwed into the tapped hole. The threaded shaft 22 is connected to a rotating shaft of the motor 24 fixed to the base plate 19. Hence, when the threaded shaft 22 rotates by being driven by the motor 24, the axially moving member 20 moves in a direction indicated by an arrow in FIG. 1 (downward in FIG. 1). This movement pushes and moves the coil presser member 16 having the tilted face 16b in contact with the outer circumferential face 20a of the axially moving member 20 toward the radially outer side. As a result, the end portion 16c of the coil presser member 16 pushes the lead portion R inside the slot 4 toward the yoke 2, whereby the segment coil SC is fixed to the stator core 1.

Note that although the embodiment describes a case where the driving means is composed of the threaded shaft 22 and the motor 24, the invention is not limited to this. Instead of the motor 24, a bolt head formed integrally with the threaded shaft 22 may be used, and the threaded shaft 22 may be rotated by rotating the bolt head with a tool or the like.

Figure 4:
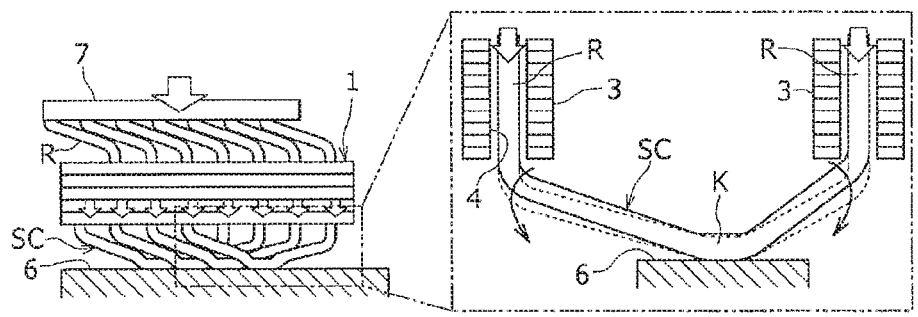
FIG. 4 is a view showing a coil bending machine of a comparative example in which a segment coil is not fixed inside a slot.

FIG. 4 is a view showing a coil bending machine of a comparative example in which a segment coil is not fixed inside a slot. In the comparative example, a segment coil SC having lead portions R inserted and placed inside slots 4 is positioned with respect to a stator core 1, by bringing the lower end of a bent portion K into contact with a positioning member 6. In this state, an axial pressing load is applied by a coil bending member 7 to bend end portions of the lead portions R toward the stator core 1. When the pressing load is large, the bent portion K of the segment coil SC may undergo plastic deformation as indicated by a broken line in FIG. 4, under the axial pressing load applied on the lead portions R. As a result, when the stator core 1 is taken out of the coil bending machine after bending, springing back of the bent portion K of the segment coil SC may cause fluctuation in the amounts of protrusion of the bent portions K from the end face of the stator core. By shortening the protrusion length of the lead portion R from the axial end face of the stator core 1, the coil end can be downsized, which is advantageous in reduction of motor size and cost. However, this requires a larger pressing load than conventionally for bending the coil, and therefore the aforementioned event is particularly likely to occur.

Figure 5:
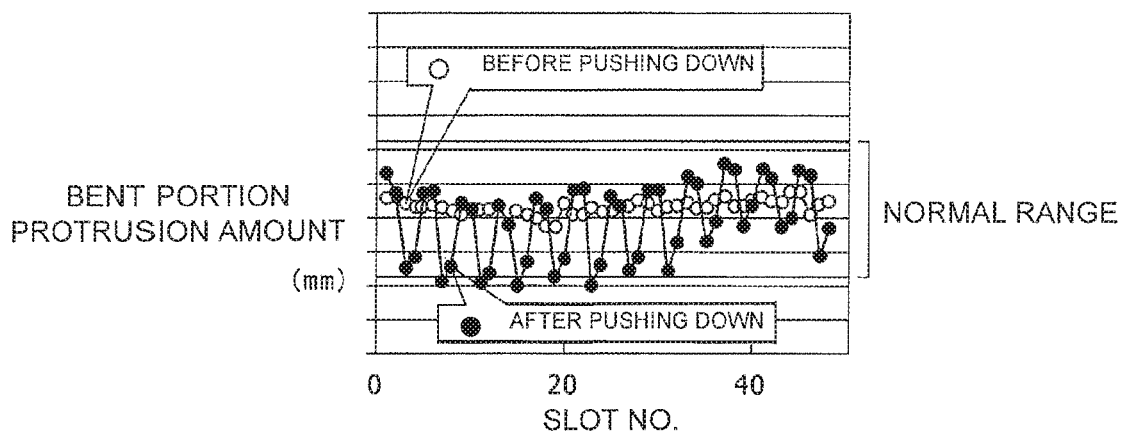
FIG. 5 is a graph showing how the protrusion amount of a bent portion changes when the segment coil is not fixed inside the slot and the end portion of the lead portion is pushed down.

FIG. 5 is a graph showing how the protrusion amount of the bent portion K changes when the segment coil SC is not fixed inside the slot 4 and an end portion of a lead portion is pushed down. The horizontal axis of the graph indicates slot numbers, and the vertical axis indicates the amount of protrusion of the bent portion K from the end face 1a of the stator core 1. In the vertical axis, a lower scale indicates a larger protrusion amount. As indicated by "○BEFORE PUSHING DOWN" in FIG. 5, before the end portion of the lead portion R is pushed down and bent, the protrusion amount of the bent portion K falls within the normal range. However, as indicated by "●AFTER PUSHING DOWN" in FIG. 5, after the end portion of the lead portion R is pushed down and bent, there are slots where the protrusion amount of the bent portion K exceeds the normal range, and fluctuation occurs in the protrusion amount of the bent portion K.

Figure 6:
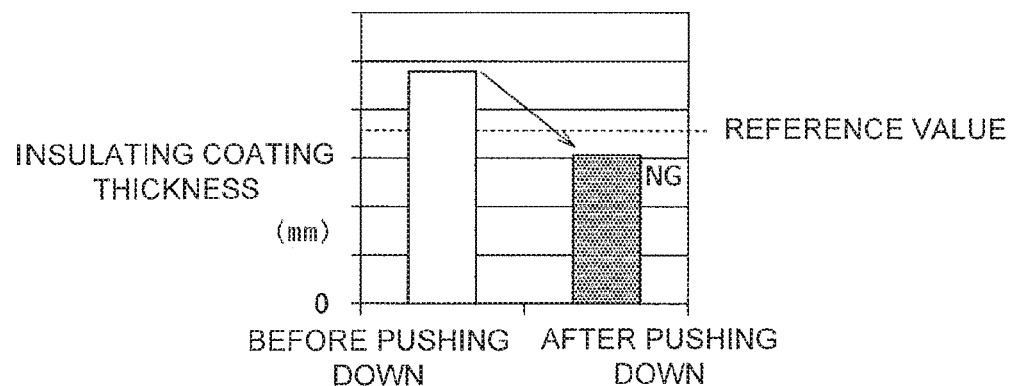
FIG. 6 is a graph showing how the thickness of an insulating coating in the bent portion changes by indentation when the segment coil is not fixed inside the slot and the end portion of the lead portion is pushed down.

FIG. 6 is a graph showing how the thickness of the insulating coating in the bent portion K changes by indentation when the segment coil SC is not fixed inside the slot 4 and the end portion of the lead portion R is pushed down. As described above, when fluctuation occurs in the amounts of protrusion of the bent portions K, the bent portions K whose gaps are designed in units of 0.1 mm, for example, are reported to contact each other and generate indentation on the insulating coating of the segment coils SC. In the indentation part, the thickness of the insulating coating, which is not less than a reference value before pushing down and bending, is reported to drop below the reference value. Accordingly, when the bending causes the bent portions of the segment coils SC to contact each other and generate indentation on the insulating coating, the insulating property between adjacent segment coils SC deteriorates.

Meanwhile, in the coil bending machine 10 of the embodiment, the coil pressing mechanism 14 press-fixes the lead portion R of the segment coil SC inside the slot 4 toward the yoke 2 in the slot 4, from the radially inner side of the stator core 1. Hence, the lead portion R does not move in the axial direction inside the slot 4, even when an axial pressing load is applied to bend the lead portion R of the segment coil SC. Accordingly, it is possible to prevent transmission of axial load to the bent portion K of the segment coil SC, so that deformation of the bent portion K of the segment coil SC can be suppressed. As a result, the amounts of protrusion of the bent portions K of the segment coils from the end face 1a of the stator core 1 can be equalized after bending of the coils.

Additionally, in the coil bending machine 10 of the embodiment, since the bent portion K does not move at the time of bending of the end portion of the lead portion R, a predetermined gap can be maintained between adjacent bent portions K, and generation of indentation on the insulating coating can be prevented. As a result, the insulating property between adjacent segment coils SC can be maintained.

Figure 7:
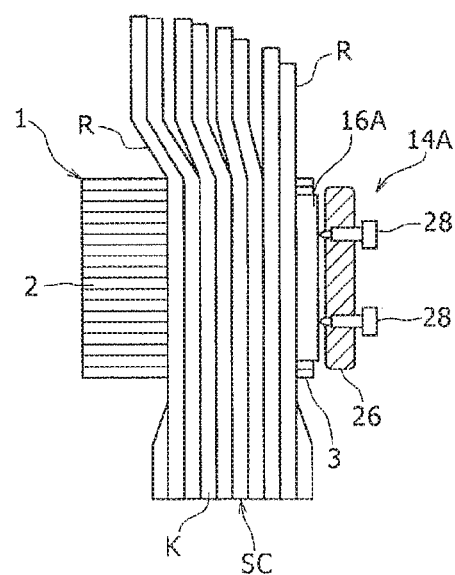
FIG. 7 is a view showing a configuration in which a coil presser member is pressed by fixing bolts.

The inventors of the present application confirmed the coil fixing force by creating a coil pressing mechanism 14A having a simple configuration as shown in FIG. 7. As shown in FIG. 7, in the coil pressing mechanism 14A, a coil presser member 16A is pushed against a segment coil SC inside a slot 4 by fastening two fixing bolts 28 screwed into a cylindrical member 26. In this case, eight lead portions R of segment coils SC are arranged inside the slot 4. Additionally, in this case, the coil bending member applies an axial pressing force of 40 kN on the segment coil SC.

Figure 8A:
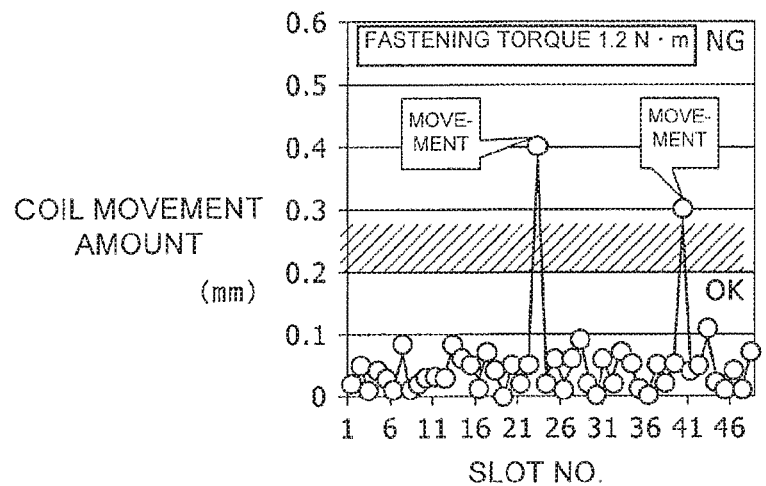
FIG. 8A is a graph showing the result of the coil movement amount when the bolt fastening torque is set to 1.2 N·m in the configuration shown in FIG. 7.
Figure 8B:
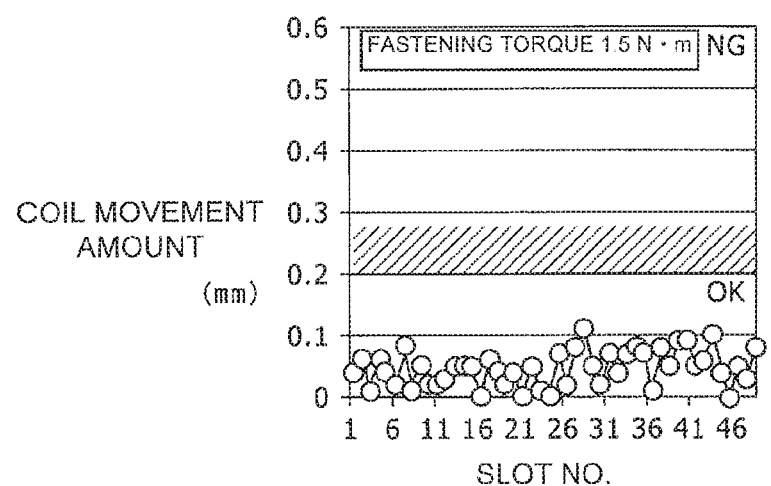
FIG. 8B is a graph showing the result of the coil movement amount when the bolt fastening torque is set to 1.5 N·m in the configuration shown in FIG. 7.

FIG. 8A is a graph showing the result of the coil movement amount when the bolt fastening torque is set to 1.2 N·m in the configuration shown in FIG. 7, and FIG. 8B is a graph showing the result of the coil movement amount when the bolt fastening torque is set to 1.5 N·m in the configuration shown in FIG. 7. As shown in FIG. 8A, when the fastening force of the fixing bolt 28 is set to 1.2 N·m, a coil movement of not less than 0.2 mm occurs in two of the 48 slots. Here, since the gap between the bent portions K of adjacent segment coils SC is assumed to be 0.1 mm, a coil movement of more than 0.2 mm is required to avoid contact between the bent portions K and generation of indentation in the insulating coating. A case where the coil movement amount exceeds 0.2 mm is regarded as failure (NG).

Next, the same axial pressing load is applied to the segment coils SC by setting the fastening torque of the fixing bolt to 1.5 N·m. As shown in FIG. 8B, it is confirmed that the lead portions R of the segment coils SC inside the slot 4 do not move in the axial direction and are press-fixed. Hence, it is confirmed that the fastening torque of the fixing bolt in the coil pressing mechanism 14A in this case is preferably 1.5 N·m or larger.

Figure 9:
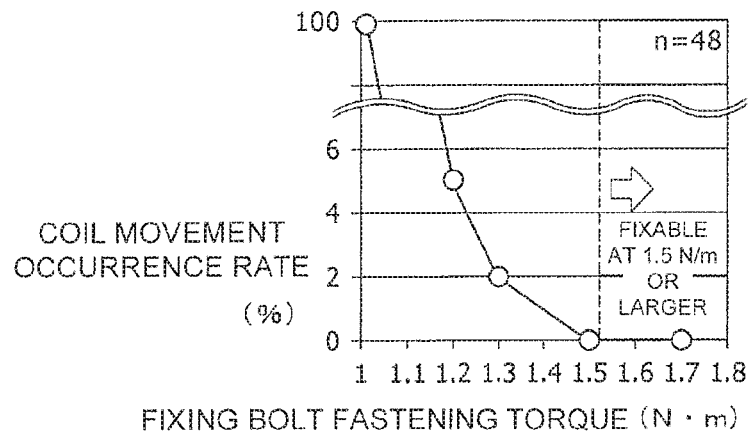
FIG. 9 is a graph showing a result of confirming that the segment coil can be fixable with a bolt fastening force of 1.5 N·m or larger.
Figure 10:
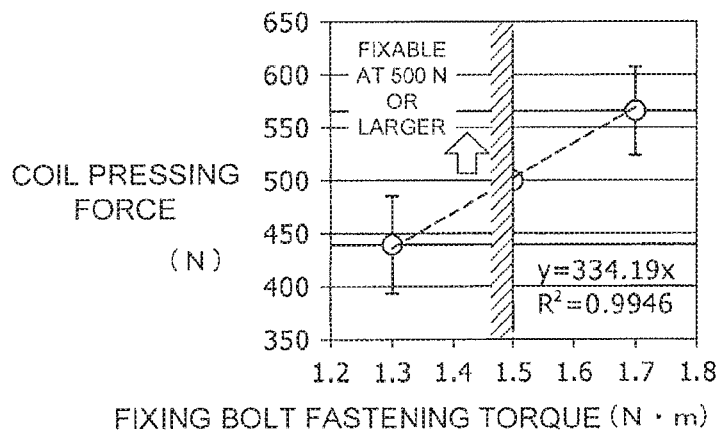
FIG. 10 is a graph showing that a bolt fastening force of 1.5 N·m or larger is equivalent to a coil pressing force of 500 N or larger.
Figure 11:
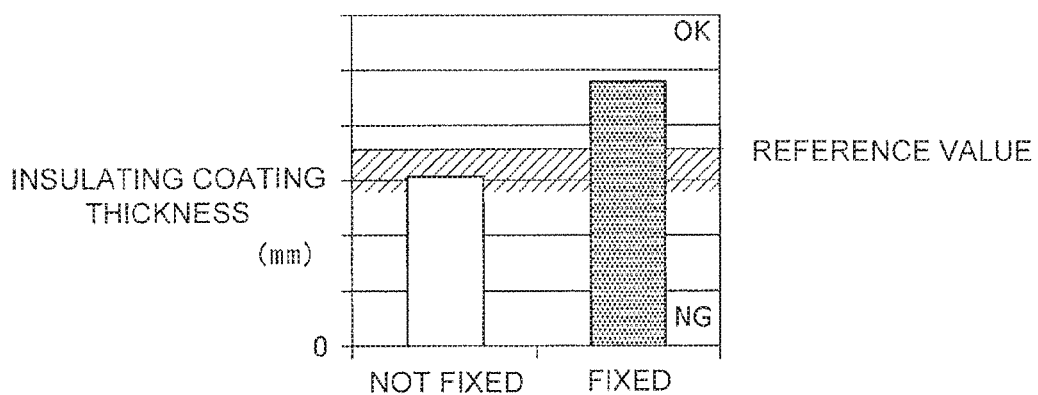
FIG. 11 is a graph showing how the thickness of the insulating coating in the bent portion changes by indentation when the segment coil is fixed with a coil pressing force of 500 N in the configuration shown in FIG. 7.

FIG. 9 is a graph showing a result of confirming that the segment coil can be fixable with a bolt fastening force of 1.5 N·m or larger. FIG. 10 is a graph showing that a bolt fastening force of 1.5 N·m or larger is equivalent to a coil pressing force of 500 N or larger. FIG. 11 is a graph showing how the thickness of the insulating coating in the bent portion changes by indentation when the segment coil is fixed with a coil pressing force of 500 N in the configuration shown in FIG. 7.

In the graph shown in FIG. 9, the horizontal axis indicates the fastening torque of the fixing bolt 28, and the vertical axis indicates the coil movement occurrence rate (%). Here, there is a total of 48 slots, and the coil movement occurrence rate is calculated by dividing the number of slots exceeding a coil movement amount of 0.2 mm by the total number of slots. As shown in FIG. 9, it is confirmed that the larger the fastening torque of the fixing bolt 28, the lower the coil movement occurrence rate, and when the fastening torque of the fixing bolt 28 is 1.5 N·m or larger, the coil movement occurrence rate is zero. That is, the lead portions R of the segment coils SC are press-fixed and do not move in the axial direction inside the slot.

In the graph shown in FIG. 10, the horizontal axis indicates the fixing bolt fastening torque (N·m), and the vertical axis indicates the coil pressing force (N). This graph shows that a bolt fastening force of the fixing bolt 28 of 1.5 N·m or larger is equivalent to a coil pressing force of the coil presser member 16A of 500 N or larger. Accordingly, it is confirmed that in the coil pressing mechanism 14A of the configuration in FIG. 7, the coils can be fixed securely inside the slot if the coil pressing force of the coil presser member 16A is set to 500 N or larger.

In the graph shown in FIG. 11, the horizontal axis indicates whether the coil is fixed inside the slot, and the vertical axis indicates the thickness of the insulating coating in the bent portion K in the segment coil SC. As shown in FIG. 11, when the segment coil SC is not fixed inside the slot, indentation occurs in the bent portion K due to moving of the coil and therefore the thickness of the insulating coating drops below the reference value in some parts. However, when the segment coil SC is fixed inside the slot, the coil does not move and the bent portions K do not interfere with each other. Hence, it is confirmed that the thickness of the insulating coating can be maintained at the reference value or larger.

Next, a coil bending machine 10A as another embodiment will be described with reference to FIGS. 12 to 14. In the following description, the same elements as those of the coil bending machine 10 of the above embodiment are assigned the same reference numerals and overlapping descriptions will be omitted.

Figure 12:
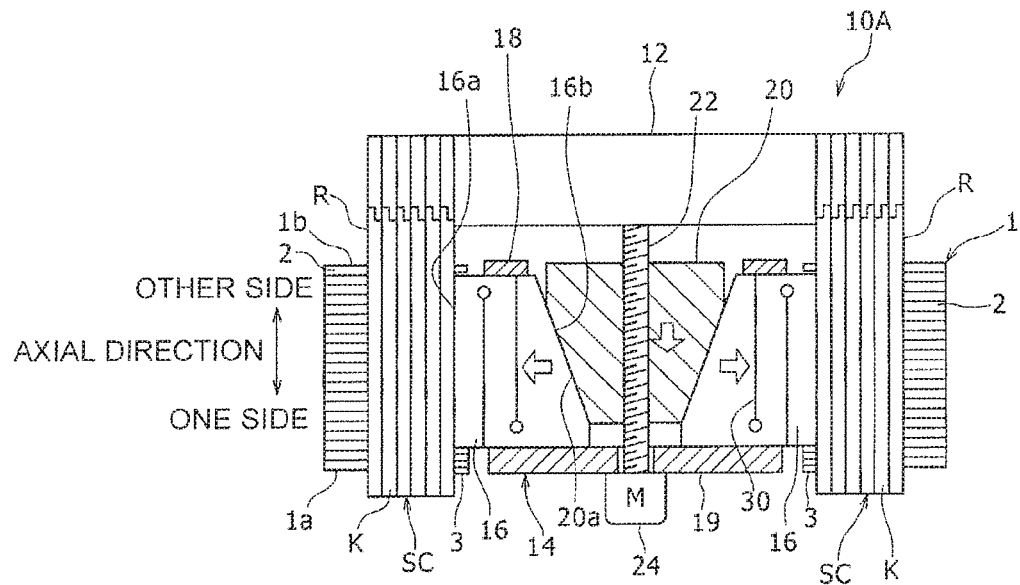
FIG. 12 is a view showing an example in which two slits are formed in a coil presser member.

FIG. 12 is a view showing an example in which two slits 30 are formed in a coil presser member 16. As shown in FIG. 12, the axially extending slits 30 penetrate the coil presser member 16 in the circumferential direction. In this embodiment, the radially inner slit 30 extends from the vicinity of an end on one side of the coil presser member 16 in the axial direction to an end on the other side, and the axially outer slit 30 extends from the vicinity of the end on the other side of the coil presser member 16 in the axial direction to the end on the one side. Such slits 30 may be formed, for example, by forming a through hole penetrating the coil presser member made of a metal plate in the plate thickness direction by laser beam machining, and using the through hole as a start end to cut by wire-saw machining.

According to this configuration, the slits 30 allow the coil presser member 16 to elastically deform more easily in the radial direction. Hence, even when there is fluctuation in the product shape of the segment coils SC, the lead portions R of the segment coils SC can be press-fixed inside the slot 4 with a more stable pressing force than when the coil presser member 16 is formed of a stiff body (i.e., when there is no slit).

Figure 13:
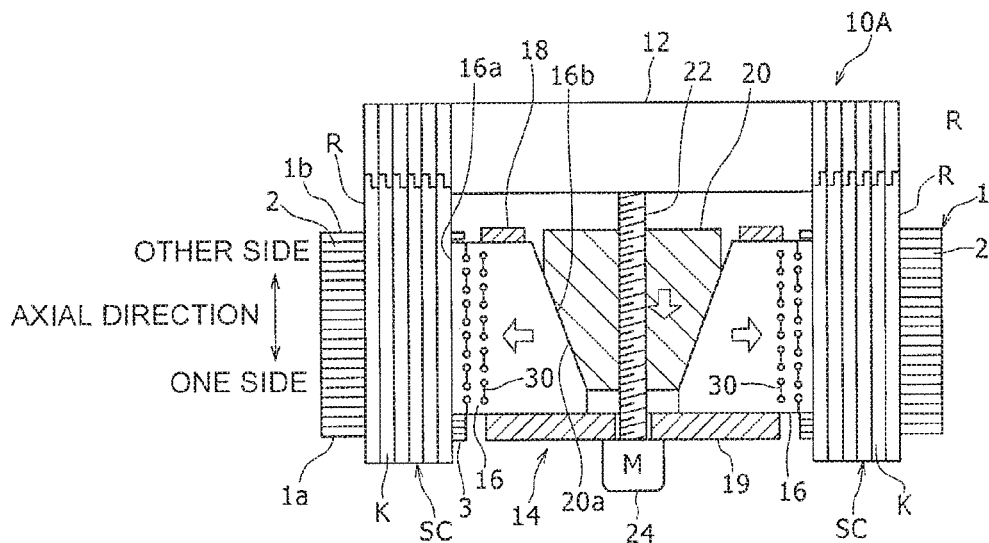
FIG. 13 is a view showing an example in which 11 slits are formed in a coil presser member.

FIG. 13 is a view showing an example in which 11 slits 30 are formed in a coil presser member 16. FIG. 14 is a graph showing the relationship between the number of the slits 30 formed in the coil presser member 16 and the fluctuation absorption amount.

As shown in FIG. 13, 11 slits 30 are formed in the coil presser member 16. More specifically, of the slits 30, six slits 30 are aligned in the axial direction in the vicinity of the axially outer end, and five slits 30 are aligned in the axial direction on the radially inner side thereof. Note that the position and number of slits 30 are appropriately changeable depending on the desired fluctuation absorption amount and manufacturing cost, for example.

Figure 14:
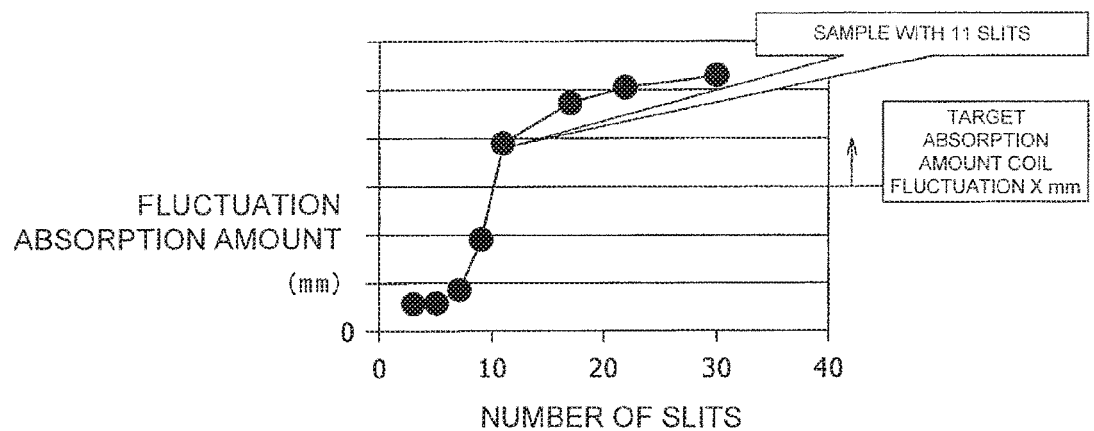
FIG. 14 is a graph showing the relationship between the number of slits formed in a coil presser member and the fluctuation absorption amount.

In the graph shown in FIG. 14, the horizontal axis indicates the number of slits, and the vertical axis indicates the fluctuation absorption amount (mm). Here, "fluctuation" refers to fluctuation in the overall radial length when multiple lead portions R of segment coils SC are radially laminated inside the slot 4. Such fluctuation causes fluctuation in the coil pressing force of the coil presser member 16 among the slots, and leads to unstable coil pressing force.

As shown in the graph of FIG. 14, it is confirmed that 11 or more slits can achieve the target absorption amount coil fluctuation of X mm or larger. Note, however, that since more slits increase the manufacturing cost of the coil presser member, 11 slits are formed in this embodiment.

Next, a coil bending machine 10B as yet another embodiment will be described with reference to FIGS. 15 to 18. In the following description, the same elements as those of the coil bending machine 10 of the aforementioned embodiment are assigned the same reference numerals and overlapping descriptions will be omitted.

Figure 15A:
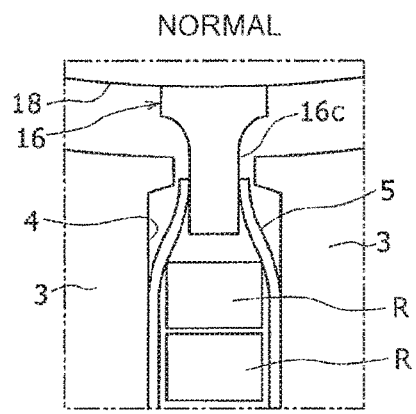
FIG. 15A is a view showing a normal state where an insulating sheet is not sandwiched between the segment coil in a slot and the coil presser member.
Figure 15B:
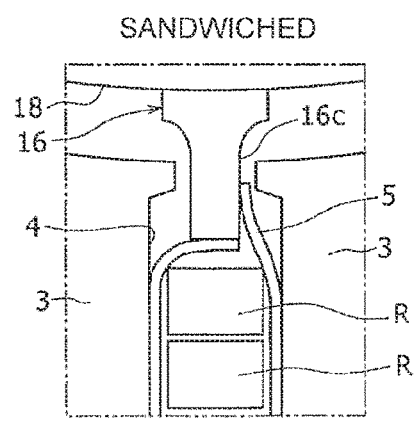
FIG. 15B is a view showing a state where the insulating sheet is sandwiched between the segment coil in the slot and the coil presser member.
Figure 16:
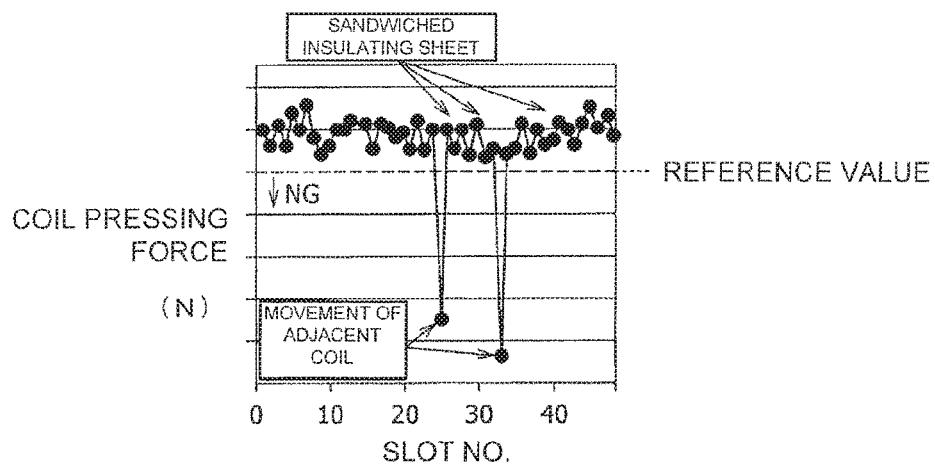
FIG. 16 is a graph showing that a coil fixing force deteriorates in adjacent slots when the insulating sheet is sandwiched.

When a segment coil SC is press-fixed inside a slot 4 by a coil presser member 16, a normal state where an insulating sheet 5 is not sandwiched between a lead portion R and the coil presser member 16 is preferably set as shown in FIG. 15A. This is because when the insulating sheet is sandwiched between the lead portion R of the segment coil SC in the slot 4 and the coil presser member 16 as in FIG. 15B, pressing force may be insufficient in the slot where the insulating sheet 5 is sandwiched and in the adjacent slot. This state is shown in the graph of FIG. 16. The graph of FIG. 16 indicates that the coil pressing force drops below the reference value in the slot where the insulating sheet 5 is sandwiched and in the two adjacent slots, and coil movement occurs.

Figure 17:
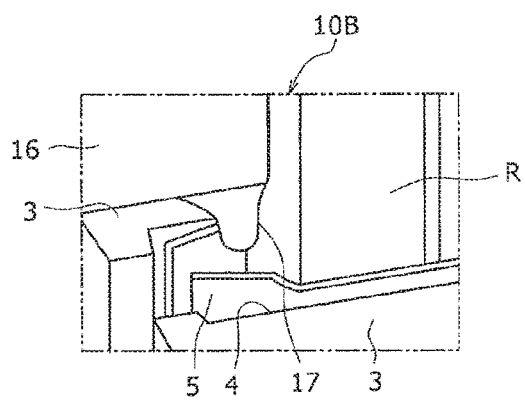
FIG. 17 is a view showing an example in which a guide protrusion is provided in a tip end lower portion of a coil presser member.

Accordingly, to avoid sandwiching of the insulating sheet 5, a guide protrusion 17 to be inserted between both ends of the insulating sheet 5 is preferably formed on an axial end face of a radially outer end portion 16c of the coil presser member 16 as in FIG. 17. Since the guide protrusion 17 is formed into a substantially truncated cone shape and has a narrow and rounded tip end (lower end), it is easily inserted between the open ends of the insulating sheet 5.

Figure 18:
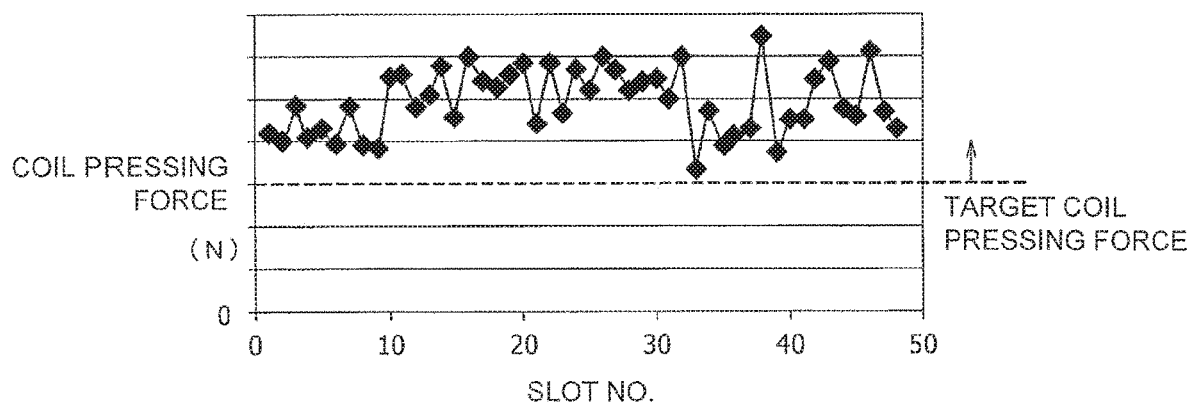
FIG. 18 is a diagram showing an advantage of the guide protrusion shown in FIG. 17.

According to this configuration, by moving the coil presser member 16 in the axial direction so as to insert the guide protrusion 17 between both ends of the insulating sheet 5, it is possible to prevent sandwiching of the insulating sheet 5 between the coil presser member 16 and the lead portion R of the segment coil SC inside the slot 4. As a result, as shown in the graph of FIG. 18, the segment coil SC can be press-fixed with a stable pressing force equal to or larger than the target coil pressing force, in all of the slots 4.

Figure 19A:
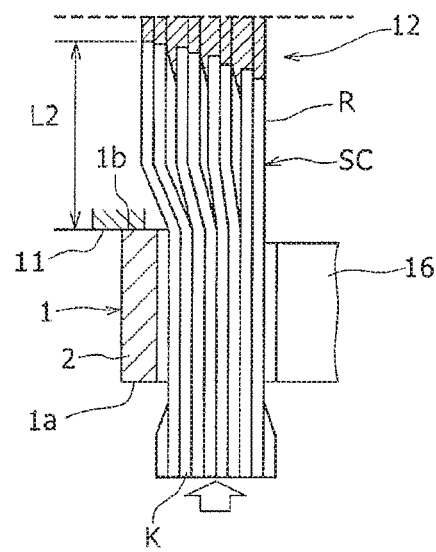
FIG. 19A is a view showing how the tip end of a lead portion of a segment coil is positioned by being brought into contact with a bending member.
Figure 19B:
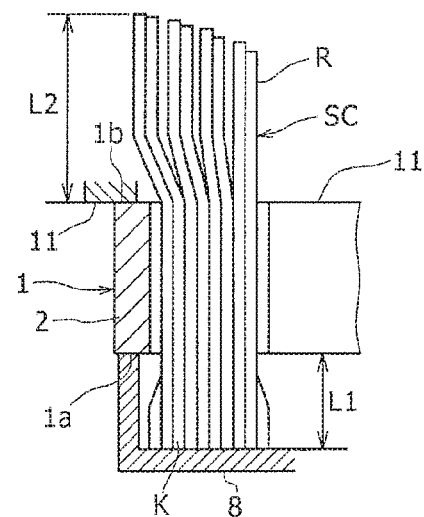
FIG. 19B is a view showing how the tip end of a bent portion of a segment coil is positioned by being brought into contact with a fixing jig.

FIG. 19A is a view showing how the tip end of a lead portion of a segment coil SC is positioned by being brought into contact with a coil bending member 12, and FIG. 19B is a view showing how the tip end of a bent portion of the segment coil SC is positioned by being brought into contact with a fixing jig 8.

As shown in FIG. 19B, when a stator core 1 in which the segment coil SC is inserted and placed in a slot 4 is set in a coil bending machine 10, the lower end of a bent portion K of the segment coil SC may be positioned by being brought into contact with the fixing jig 8. In this case, although a protrusion amount L1 of the bent portion K from an end face 1a on one side of the stator core 1 in the axial direction can be aligned, a protrusion length L2 of the lead portion R of the segment coil SC protruding from an end face 1b on the other side of the stator core 1 in the axial direction includes manufacturing error of the segment coil SC itself and error in the lamination thickness of the stator core 1 in the axial direction.

Accordingly, as shown in FIG. 19A, when the stator core 1 in which the segment coil SC is inserted and placed in the slot 4 is set in the coil bending machine 10, the segment coil SC is pushed from the bent portion K side, so that the tip end of the lead portion R protruding from the end face on the other side of the stator core 1 in the axial direction is pushed against a coil bending member 12. In this state, the segment coil SC is pushed by the coil presser member 16 to be press-fixed to the stator core 1. With this configuration, the protrusion length L2 of the lead portion R from the end face 1*b* on the other side of the stator core 1 in the axial direction does not include the production error of the segment coil SC and the error in the lamination thickness of the stator core 1, and therefore the predefined dimension can be set accurately. As a result, the bending step by the coil bending machine 10 can be performed favorably.

Note that the present disclosure is not limited to the aforementioned embodiments and its modifications, and various changes and improvements may be made within the matters described in the scope of claims of the present application, as a matter of course.

REFERENCE SIGNS LIST

1 stator core, 1*a*, 1*b* end face, 2 yoke, 3 teeth, 4 slot, 5 insulating sheet, 6 positioning member, 7, 12 coil bending member, 8 fixing jig, 10, 10A, 10B coil bending machine, 11 fixing member, 14, 14A coil pressing mechanism, 16, 16A coil presser member, 16*a* side face, 16*b* tilted face, 16*c* end portion, 17 guide protrusion, 18 holding member, 18*a* guide groove, 19 base plate, 20 axially moving member, 20*a* outer circumferential face, 22 threaded shaft, 24 motor, 26 cylindrical member, 28 fixing bolt, 30 slit, SC segment coil, K bent portion, R lead portion.

The invention claimed is:

1. A coil bending machine comprising:
   a coil bending member comprising an engaging portion and a rotating mechanism adapted to rotate in a circumferential direction and move towards a stator core to bend end portions of lead portions protruding from an axial end face of the stator core toward the stator core while the lead portions of a segment coil are inserted into two slots; and
   a coil pressing mechanism adapted to push and press-fix segment coils inside a slot toward a cylindrical yoke in the slot, from a radially inner side of the stator core, wherein
   the stator core comprises the cylindrical yoke and multiple teeth that protrude radially inward from the cylindrical yoke and are spaced uniformly in the circumferential direction, the slot being formed between circumferentially adjacent teeth,
   the segment coil is a U-shaped lead wire comprising a bent portion and two of the lead portions extending from the bent portion,
   the coil pressing mechanism comprises a coil presser member that press-fits the segment coils inside the slot toward a radially outer side, and
   a plurality of slits penetrate the coil presser member in the circumferential direction extending in the axial direction of the coil presser member to allow the coil presser member to elastically deform in the radial direction.

2. The coil bending machine according to claim 1, wherein
   the coil pressing mechanism further comprises:
      a cylindrical holding member that holds the coil presser member in a radially movable manner,
      an axially moving member that is provided on an inner side of the cylindrical holding member in an axially movable manner, and has a tapered outer circumferential face in contact with an inner circumferential tilted face of the cylindrical holding member, and
      a motor and a threaded shaft that move the axially moving member in an axial direction.

3. The coil bending machine according to claim 2, wherein:
   an insulating sheet is provided along a slot inner wall face inside the slot;
   both ends of the insulating sheet on the radially inner side are arranged to open toward a radial opening of the slot; and
   a guide protrusion inserted between the both ends of the insulating sheet, which is formed on an axial end face of a radially outer end portion of the coil presser member.

4. The coil bending machine according to claim 1, wherein:
   an insulating sheet is provided along a slot inner wall face inside the slot;
   both ends of the insulating sheet on the radially inner side are arranged to open toward a radial opening of the slot; and
   a guide protrusion inserted between the both ends of the insulating sheet, which is formed on an axial end face of a radially outer end portion of the coil presser member.

* * * * *